(12) United States Patent
Sullivan et al.

(10) Patent No.: US 11,105,330 B2
(45) Date of Patent: Aug. 31, 2021

(54) POWER TRANSMITTING COMPONENT HAVING A SHAFT WITH A CIRCUMFERENTIAL CHANNEL COMMUNICATING FLUID BETWEEN A SHAFT-DRIVEN PUMP AND A FEED CONDUIT FORMED IN THE SHAFT

(71) Applicant: BorgWarner Inc., Auburn Hills, MI (US)

(72) Inventors: Christopher Sullivan, Rochester Hills, MI (US); Pritish Khale, Auburn Hills, MI (US); Larry A. Pritchard, Macomb, MI (US)

(73) Assignee: BorgWarner Inc., Auburn Hills, MI (US)

( * ) Notice: Subject to any disclaimer, the term of this patent is extended or adjusted under 35 U.S.C. 154(b) by 323 days.

(21) Appl. No.: 16/115,734

(22) Filed: Aug. 29, 2018

(65) Prior Publication Data

US 2020/0072217 A1 Mar. 5, 2020

(51) Int. Cl.
| | |
|---|---|
| *F04C 15/00* | (2006.01) |
| *F04C 2/10* | (2006.01) |
| *F16D 1/10* | (2006.01) |
| *F16H 57/04* | (2010.01) |
| *F16H 7/06* | (2006.01) |

(52) U.S. Cl.
CPC ............ *F04C 15/0061* (2013.01); *F04C 2/10* (2013.01); *F16D 1/10* (2013.01); *F16H 7/06* (2013.01); *F16H 57/043* (2013.01); *F16H 57/0436* (2013.01); *F04C 15/0088* (2013.01); *F04C 2240/20* (2013.01); *F04C 2240/603* (2013.01); *F16D 2001/103* (2013.01); *F16H 57/0484* (2013.01)

(58) Field of Classification Search
CPC ...... F04C 15/0061; F04C 2/10; F04C 15/066; F04C 2/102; F16D 1/10; F16D 2001/103; F16H 57/043; F16H 57/0436; F16H 7/06; F16H 57/0484; F16H 57/0441; F16H 57/0435; B60K 25/06; B60K 17/344; F16C 3/02
USPC ................................................. 418/69; 464/7
See application file for complete search history.

(56) References Cited

U.S. PATENT DOCUMENTS

| | | | |
|---|---|---|---|
| 4,955,852 A * | 9/1990 | Morisawa | F16H 3/60 475/140 |
| 4,961,669 A | 10/1990 | Itoh et al. | |

(Continued)

*Primary Examiner* — Mary Davis
*Assistant Examiner* — Paul W Thiede
(74) *Attorney, Agent, or Firm* — Burris Law, PLLC

(57) ABSTRACT

A power transmitting component having a first shaft and a pump. The first shaft has a longitudinal bore, a pump mount and a feed conduit. The pump mount has a circumferentially extending surface, a drive portion and a channel that extends circumferentially about the first shaft. The channel is disposed along a longitudinal axis of the first shaft between the drive portion and the circumferentially extending surface. The feed conduit intersects and fluidly couples the longitudinal bore and the channel. The pump has a pump housing, a first rotor and a pump outlet. The pump housing is mounted about the circumferentially extending surface and is disposed circumferentially about the channel. The first rotor is coupled to the drive portion for rotation therewith. The pump outlet is coupled in fluid communication with the channel.

12 Claims, 8 Drawing Sheets

(56) References Cited

U.S. PATENT DOCUMENTS

| | | |
|---|---|---|
| 5,577,588 A | 11/1996 | Raszkowski |
| 6,688,866 B2 | 2/2004 | Lambert et al. |
| 6,837,819 B2 | 1/2005 | Foster |
| 7,051,611 B2 * | 5/2006 | Fauth ................ B21K 1/12 74/425 |
| 7,694,780 B2 | 4/2010 | Beels van Heemstede et al. |
| 7,694,794 B2 | 4/2010 | Biles et al. |
| 7,789,779 B2 | 9/2010 | Faust |
| 8,428,838 B2 | 4/2013 | Kondo et al. |
| 8,491,289 B2 | 7/2013 | Showalter |
| 8,783,995 B2 | 7/2014 | Besler et al. |
| 9,689,399 B2 | 6/2017 | Heitz et al. |
| 2004/0162176 A1 * | 8/2004 | Foster ............. B60K 17/3467 475/210 |
| 2007/0137966 A1 | 6/2007 | Francis et al. |
| 2009/0078075 A1 | 3/2009 | Vassaux |
| 2010/0122887 A1 | 5/2010 | Pritchard et al. |
| 2010/0316519 A1 * | 12/2010 | Showalter ........ F04C 15/0061 418/61.3 |
| 2012/0247903 A1 | 10/2012 | Pritchard |
| 2015/0191198 A1 | 7/2015 | Perichon et al. |
| 2015/0323059 A1 | 11/2015 | Pritchard |
| 2016/0009311 A1 | 1/2016 | Khale et al. |
| 2018/0010649 A1 | 1/2018 | Sullivan |
| 2018/0010682 A1 | 1/2018 | Pritchard et al. |
| 2018/0112765 A1 * | 4/2018 | Kuperman ............ F16C 3/02 |
| 2018/0135740 A1 | 5/2018 | Kodama et al. |
| 2018/0209533 A1 * | 7/2018 | Palazzolo .......... F16H 57/0435 |

\* cited by examiner

POWER TRANSMITTING COMPONENT HAVING A SHAFT WITH A CIRCUMFERENTIAL CHANNEL COMMUNICATING FLUID BETWEEN A SHAFT-DRIVEN PUMP AND A FEED CONDUIT FORMED IN THE SHAFT

FIELD

The present disclosure relates to a power transmitting component having a shaft with a circumferential channel communicating fluid between a shaft-driven pump and a feed conduit formed in the shaft.

BACKGROUND

Shaft-driven pumps are commonly employed in power transmitting components to provide pressurized fluid to a longitudinally extending bore formed in the shaft. The pressurized fluid in the bore is typically employed to lubricate elements of the power transmitting component and/or provides a source of hydraulic power to one or more hydraulic actuators. Such shaft-driven pumps can have a rotor that is non-rotatably coupled to the shaft via mating sets of spline teeth formed in the rotor and on the shaft. The outlet of the pump is coupled in fluid connection to one or more feed conduits that extend radially between an outer surface of the shaft and the bore. It is desirable that the feed conduit(s) and the spline teeth be spaced as close as possible to one another to improve alignment.

Commonly, an undercut (i.e., a circumferential channel) is formed on the shaft between the spline teeth on the shaft and the feed conduit(s). The undercut provides clearance between the spline teeth on the shaft and an annular mount surface on the shaft about which the pump is mounted; the clearance is needed during the fabrication of the spline teeth to fully form the ends of the spline teeth that intersect the undercut. To avoid the formation of stress concentrations, the feed conduit(s) is/are spaced apart from the undercut. The spline teeth are therefore spaced apart from the feed conduit(s) by a distance that equals the width of the undercut and the spacing between the undercut and the feed conduit(s), which tends to be a larger distance than is desirable. Moreover, fluid flow to the feed conduit(s) from the outlet of the pump can be restricted depending on the geometry of the outlet of the pump, the quantity of the feed conduits and the orientation of the shaft relative to the outlet of the pump.

SUMMARY

This section provides a general summary of the disclosure, and is not a comprehensive disclosure of its full scope or all of its features.

In one form, the present disclosure provides a power transmitting component having a first shaft and a pump. The first shaft has a longitudinal bore, a pump mount and a feed conduit. The pump mount has a circumferentially extending surface, a drive portion and a channel that extends circumferentially about the first shaft. The channel is disposed along a longitudinal axis of the first shaft between the drive portion and the circumferentially extending surface. The feed conduit intersects and fluidly couples the longitudinal bore and the channel. The pump has a pump housing, a first rotor and a pump outlet. The pump housing is mounted about the circumferentially extending surface and is disposed circumferentially about the channel. The first rotor is coupled to the drive portion for rotation therewith. The pump outlet is coupled in fluid communication with the channel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
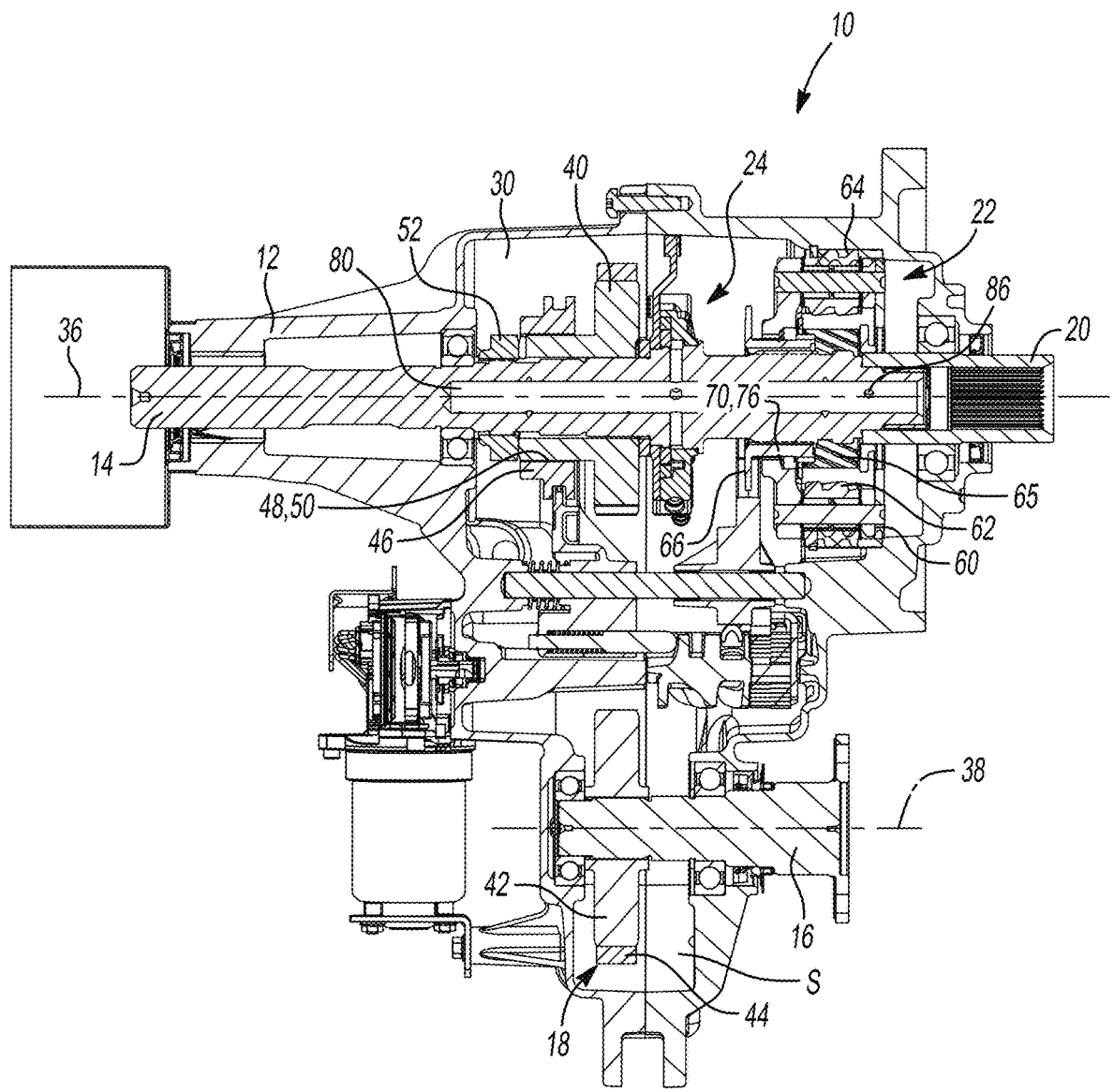
FIG. 1 is a longitudinal cross-section of an exemplary power transmitting component constructed in accordance with the teachings of the present disclosure.

With reference to FIG. 1 of the drawings, an exemplary power transmitting component constructed in accordance with the teachings of the present disclosure is generally indicated by reference numeral 10. The power transmitting component 10 is illustrated as being a transfer case, but it will be appreciated that the teachings of the present disclosure have application to other type of power transmitting components and as such, it will be understood that the particular example provided is not intended to limit the scope of the claims in any way.

The power transmitting component can include a housing 12, a first shaft 14, a second shaft 16, a power transfer mechanism 18, an input member 20, a transmission 22 and a pump 24. The housing 12 can define a cavity 30 into which the first and second shafts 14 and 16, the power transfer mechanism 18, the input member 20, the transmission 22 and the pump 24 can be received. The housing 12 can support the first shaft 14 for rotation about a first axis 36 and can support the second shaft 16 for rotation about a second axis 38.

The power transfer mechanism 18 can comprise any means for transmitting rotary power between the first and second shafts 14 and 16, such as a transmission. In the example provided, the power transfer mechanism 18 includes first and second sprockets 40 and 42, respectively, and a chain 44 that is engaged to the first and second sprockets 40 and 42 to transmit rotary power therebetween. The first and second sprockets 40 and 42 can be fixedly coupled to the first and second shafts 14 and 16, respectively. Optionally, a clutch, such as a friction clutch, a sliding collar, or a dog clutch, could be employed to selectively rotationally couple the first shaft 14 to the first sprocket 40 or to selectively rotationally couple the second sprocket 42 to the second shaft 16. In the particular example provided, a sliding collar 46 is employed to selectively rotationally couple the first sprocket 40 to the first shaft 14. The sliding collar 46 includes a female splined or toothed bore 48 that is received onto a male splined or toothed hub 50 on the first sprocket 40 to thereby non-rotatably but axially slidably couple the sliding collar 46 to the male splined hub 50. The sliding collar 46 can be moved along the first axis 36 into a first position, in which the sliding collar 46 engages a male splined or toothed wheel 52 that is fixedly coupled to the first shaft 14 to thereby rotatably couple the first sprocket 40 to the first shaft 14, and a second position in which the sliding collar 46 is disengaged from the male splined wheel 52 to thereby rotatably decouple the first sprocket 40 from the first shaft 14.

The input member 20 is configured to transmit rotary power in a power transmission path between a source of rotary power, such as a vehicle powertrain (not shown), and the first shaft 14. In the example provided, the input member 20 is a shaft that is supported by the housing 12 for rotation about the first axis 36.

The transmission 22, which is optional, can be disposed in the power transmission path between the input member 20 and the first shaft 14. In the example illustrated, the transmission 22 is a single stage, two-speed planetary gearset having a planet carrier 60, a plurality of planet gears 62, a ring gear 64, a sun gear 65 and a coupling sleeve 66. The planet carrier 60 is fixedly coupled to the input member 20 and journally supports each of the planet gears 62 for rotation about respective planet gear axes that are disposed circumferentially about the first axis 36. The ring gear 64 is fixedly coupled to the housing 12 and is disposed about the planet carrier 60 so as to be in meshing engagement with the planet gears 62. The sun gear 65 can be coupled to the input member 20 for rotation therewith. The sun gear 65 can be received within the planet carrier 60 and radially between the planet gears 62. The sun gear 65 is meshed with the planet gears 62. The coupling sleeve 66 can have a set of internal teeth 70, a set of sun engagement teeth (not specifically shown) and a set of planet carrier engagement teeth (not specifically shown). The internal teeth 70 can be non-rotatably but axially slidably coupled to mating teeth 76 formed on the first shaft 14 to permit the coupling sleeve 66 to be moved between a high range position and a low range position. Placement of the coupling sleeve 66 in the low range position meshes the sun gear engagement teeth on the coupling sleeve 66 with mating teeth (not specifically shown) on the sun gear 65, which causes the transmission 22 to operate in a first gear ratio. Positioning of the coupling sleeve 66 in the high range position meshes the planet carrier engagement teeth on the coupling sleeve 66 with mating teeth (not specifically shown) formed on the planet carrier 60, which causes the transmission to operate in a second gear ratio (i.e., a 1:1 gear ratio in which the rotational speed of the coupling sleeve 66 and the first shaft 14 is equal to the rotational speed of the planet carrier 60 and the input member 20).

The pump 24 is configured to receive rotary power from the first shaft 14 and to output a pressurized fluid that is transmitted through a longitudinal bore 80 formed in the first shaft 14. The pump 24 can be any type of pump, such as a gear pump or a vane pump, but in the particular example provided, the pump 24 is a gerotor pump.

Figure 2:
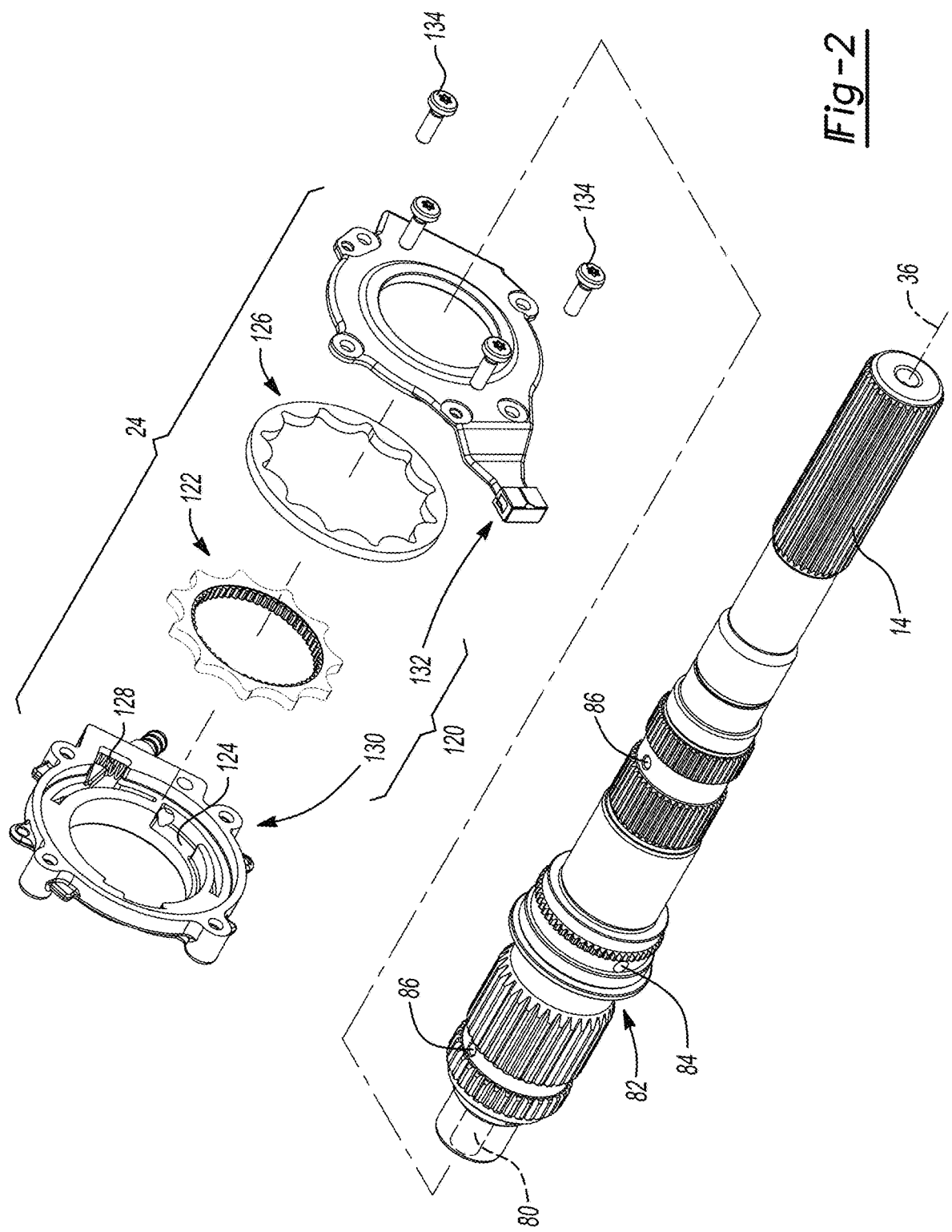
FIG. 2 is an exploded perspective view of a portion of the power transmitting component of FIG. 1, the view depicting a first shaft and a pump in more detail.

With reference to FIG. 2, the first shaft 14 can define a pump mount 82, a feed conduit 84 and optionally one or more lubricant feed apertures 86. The longitudinal bore 80 can extend fully or partly through the first shaft 14, for example along the first axis 36.

Figure 3:
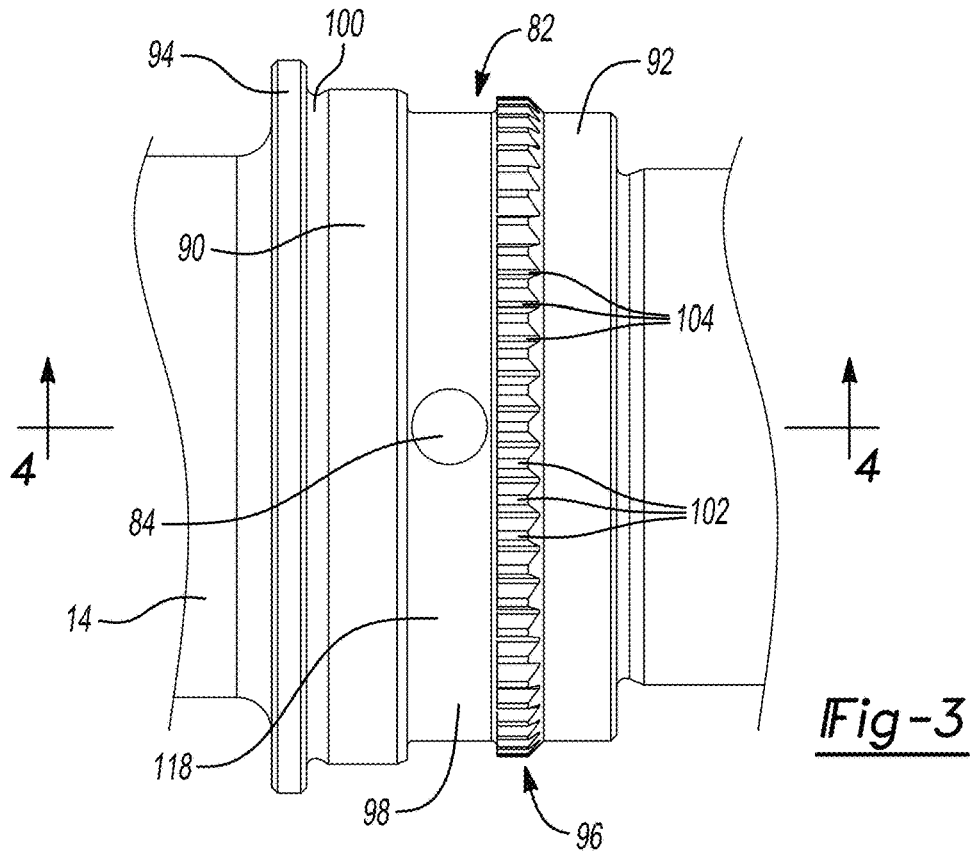
FIG. 3 is a top plan view of a portion of the first shaft illustrating a pump mount in more detail.
Figure 4:
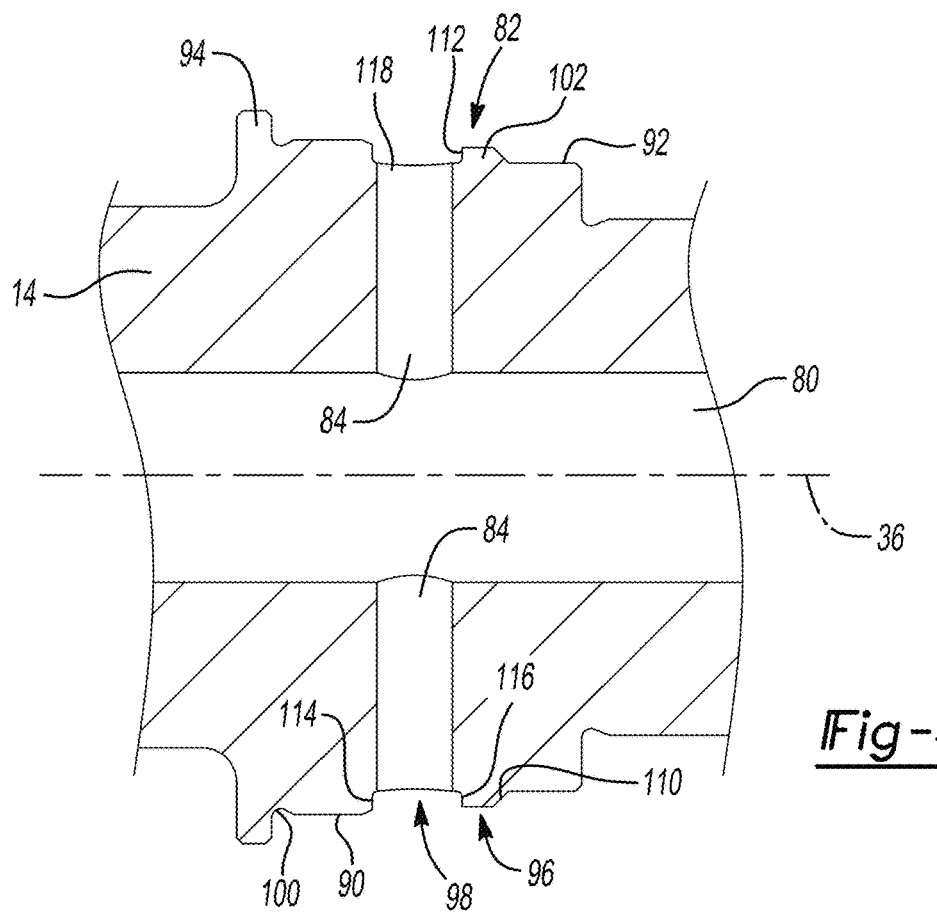
FIG. 4 is a section view taken along the line 4-4 of FIG. 3.

With reference to FIGS. 3 and 4, the pump mount 82 can have a first circumferentially extending surface 90, a second circumferentially extending surface 92, a shoulder 94, a drive portion 96 and a channel 98. The first and second circumferentially extending surface 90 and 92 are round cylindrical surfaces that are disposed concentrically about the first axis 36. The shoulder 94 can be disposed on a side or axial end of the first circumferentially extending surface 90 opposite the second circumferentially extending surface 92. The shoulder 94 can be larger in diameter than the first circumferentially extending surface 90 so as to extend radially outwardly therefrom. An undercut groove 100 can be disposed axially along the first axis 36 between the shoulder 94 and the first circumferentially extending surface 90. The drive portion 96 is disposed along the first axis 36 adjacent to the second circumferentially extending surface 92 and the channel 98 and can be configured in any desired manner to facilitate the transmission of rotary power between the first shaft 14 and an input of the pump 24 (FIG. 1). For example, the drive portion 96 could be a round, cylindrical segment that is configured to engage the input of the pump 24 with an interference fit. Alternatively, the drive portion 96 could be a non-round segment on the first shaft 14, such as a D-shaped segment, that is configured to be received into a mating hole in an aperture in the input of the pump 24 (FIG. 1). In the example provided, the drive portion 96 comprises a plurality of teeth 102 that are disposed about the circumference of the first shaft 14. The teeth 102 can be formed in any manner desired, such as milling or broaching, but in the particular example provided, are formed via a cold forming process such as rolling. Valleys 104 are disposed circumferentially between adjacent teeth 102. The diameter of the first shaft 14 across the valleys 104 is larger than a diameter of the second circumferentially extending surface 92. A first axial end 110 of the teeth 102 that is adjacent to the second circumferentially extending surface 92 can be chamfered to aid in the installation of the input of the pump 24 to the pump mount 82, while a second, opposite axial end 112 of the teeth 102 that is adjacent to the channel 98 can be formed in a desired manner, such as with tooth end surfaces that are planar over the entire area of each of the teeth 102 and that are disposed in a plane that is perpendicular to the first axis 36. The channel 98 can be formed into the first shaft 14 along the first axis 36 between the first circumferentially extending surface 90 and the drive portion 96. The channel 98 can have a first side wall 114, which can abut the first circumferentially extending surface 90, a second side wall 116, which can abut the tooth end surfaces of the second ends 112 of the teeth 102, and a circumferential surface 118 that can be disposed between the first and second side walls 114 and 116. In the particular example provided, small radii are employed where the first and second side walls 114 and 116 intersect the circumferential surface 118 of the channel 98, and a chamfer is employed where the first side wall 114 intersects the first circumferentially extending surface 90.

The feed conduit 84 can be formed radially through at least a portion of the first shaft 14 between the circumferential surface 118 of the channel 98 and the longitudinal bore 80. The feed conduit 84 could be formed completely through the first shaft 14 (i.e., so as to intersect both the longitudinal bore 80 and the circumferential surface 118 of the channel 98 in two locations each), or could be formed through one side of the first shaft 14 (i.e., so as to intersect both the longitudinal bore 80 and the circumferential surface 118 of the channel 98 in one location each).

It will be appreciated that placement of the feed conduit 84 fully on the circumferential surface 118 of the channel 98 and the termination of the teeth 102 at the tooth end surfaces on the second ends 112 at the second side wall 116 of the channel 98 facilitates the formation of the drive portion 96 without the need to incorporate an undercut between the teeth 102 and the feed conduit 84, as well as additional axial space between the undercut and the feed conduit 84 that would be employed to eliminate stress concentrations. Consequently, the tooth end surfaces of the second ends 112 of the teeth 102 can be spaced relatively close to the feed conduit 84, such by a length that is less than or equal to 2 mm. In practice, the spacing between the feed conduit 84 and the tooth end surfaces on the second ends 112 of the teeth 102 can be less than or equal to 1 mm, and more preferably less than or equal to 0.5 mm, and more preferably less than or equal to 0.25 mm.

Returning to FIG. 2, the pump 24 can include a pump housing 120, a first rotor 122, and a pump outlet 124. In the particular example provided, the pump 24 is a gerotor pump, the pump 24 further includes a second rotor 126 and a relief valve 128, and the pump housing 120 includes a housing member 130, a cover 132 and a plurality of threaded fasteners 134 that fixedly couple the cover 132 to the housing member 130.

With reference to FIGS. 5 through 8, the pump housing 120 can define a shaft bore 150, a rotor chamber 152, an inlet groove 154, an inlet 156, an outlet groove 158, the pump outlet 124, a relief conduit 160 and a valve seat 162. The shaft bore 150 is formed through the pump housing 120 and is sized to receive the first shaft 14 therethrough. Portions of the opposite axial ends of the pump housing 120 can be employed to control fluid leakage between the pump housing 120 and the first shaft 14. In this regard, seal elements (not shown) can be mounted to the housing member 130 and the cover 132 and can sealingly engage the first and second circumferentially extending surface 90 and 92, respectively. In the example provided, however, a first desired clearance is formed between the first circumferentially extending surface 90 and the portion of the shaft bore 150 that extends through the housing member 130, while a second desired clearance is formed between the second circumferentially extending surface 92 and the portion of the shaft bore 150 that extends through the cover 132 to provide controlled fluid flow between the first shaft 14 and the housing member 130 and between the first shaft 14 and the cover 132.

Figure 5:
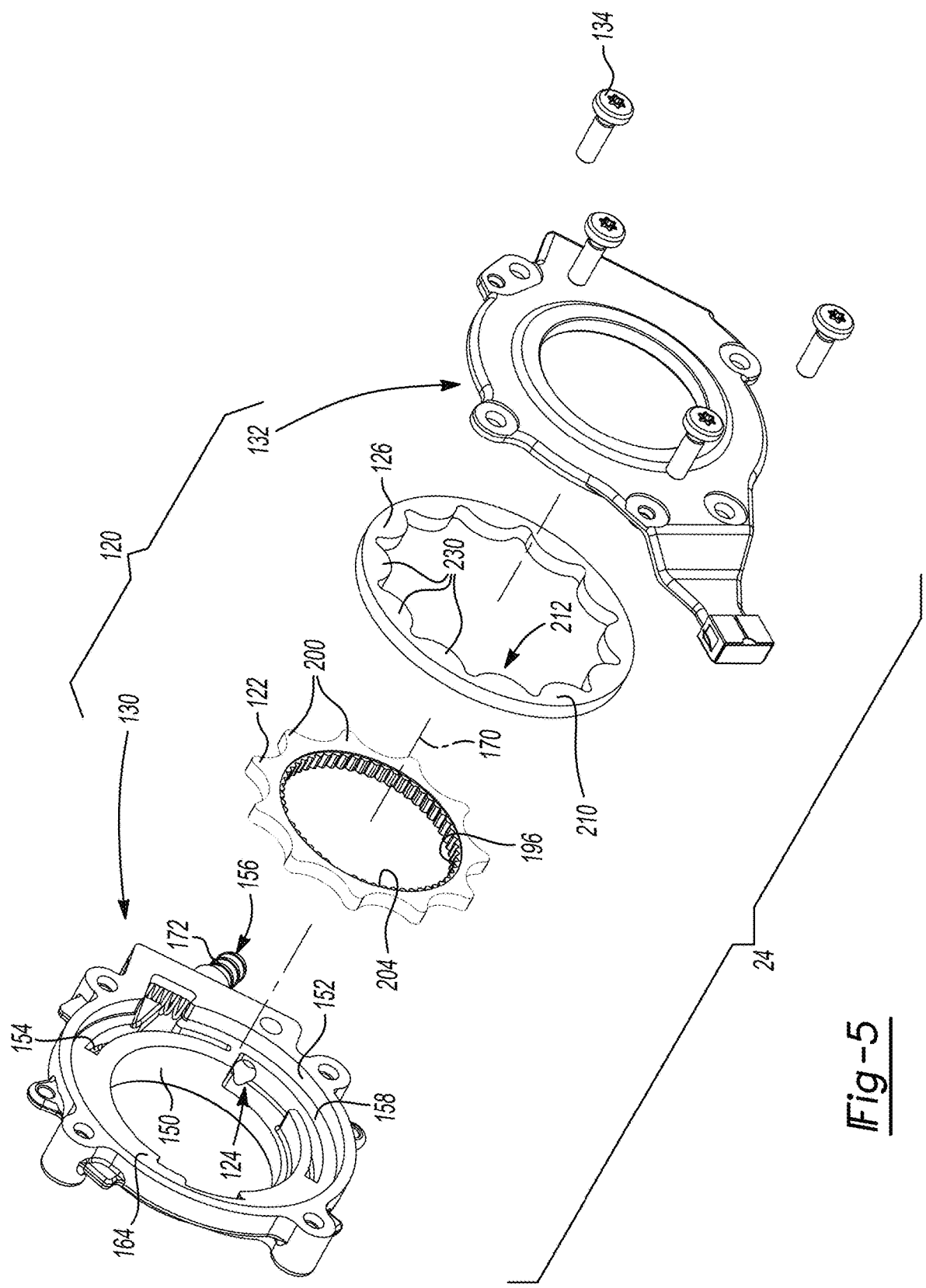
FIG. 5 is an exploded perspective view of the pump.
Figure 6:
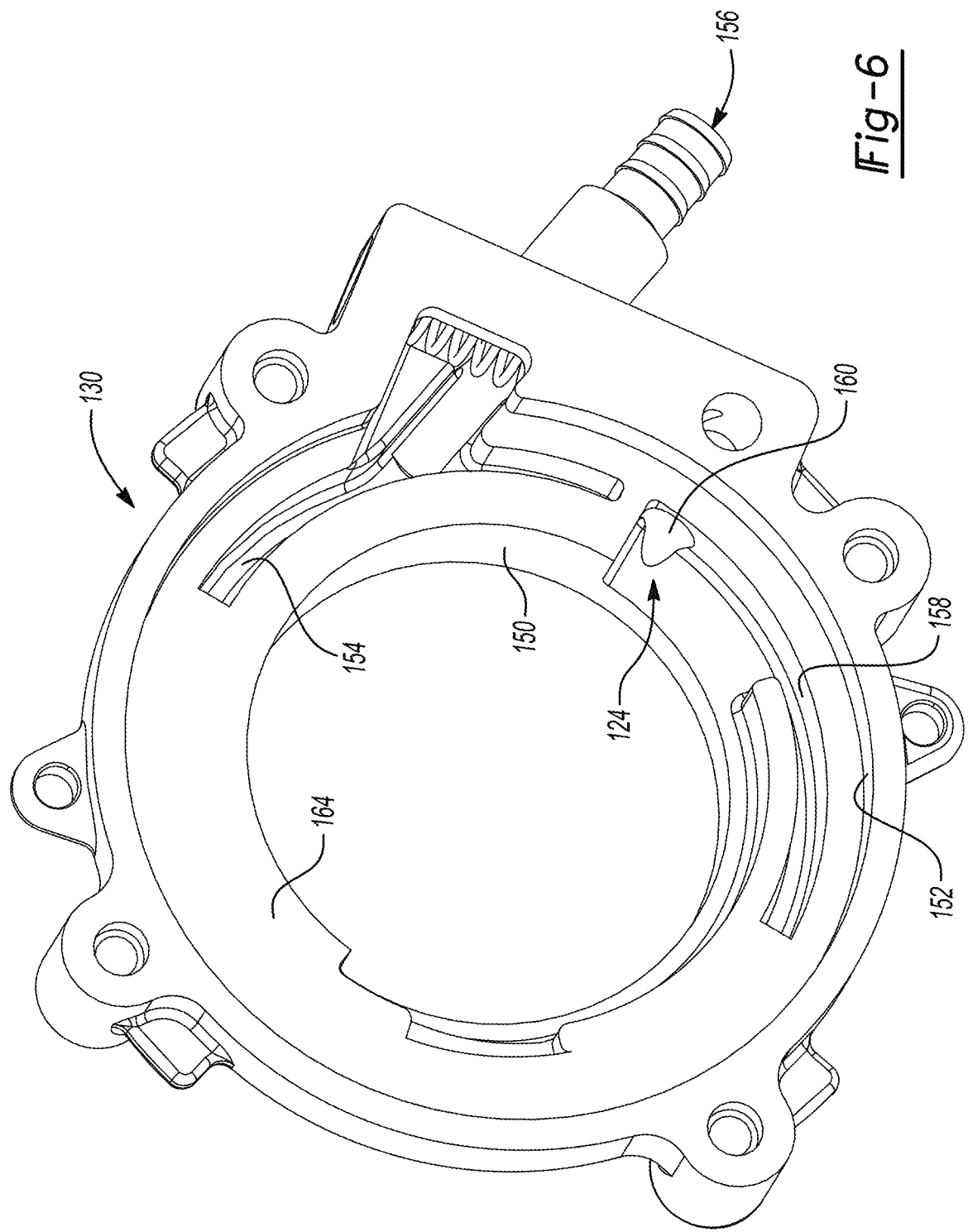
FIG. 6 is a perspective view of a portion of the pump, the view illustrating a housing member of the pump in more detail.
Figure 7:
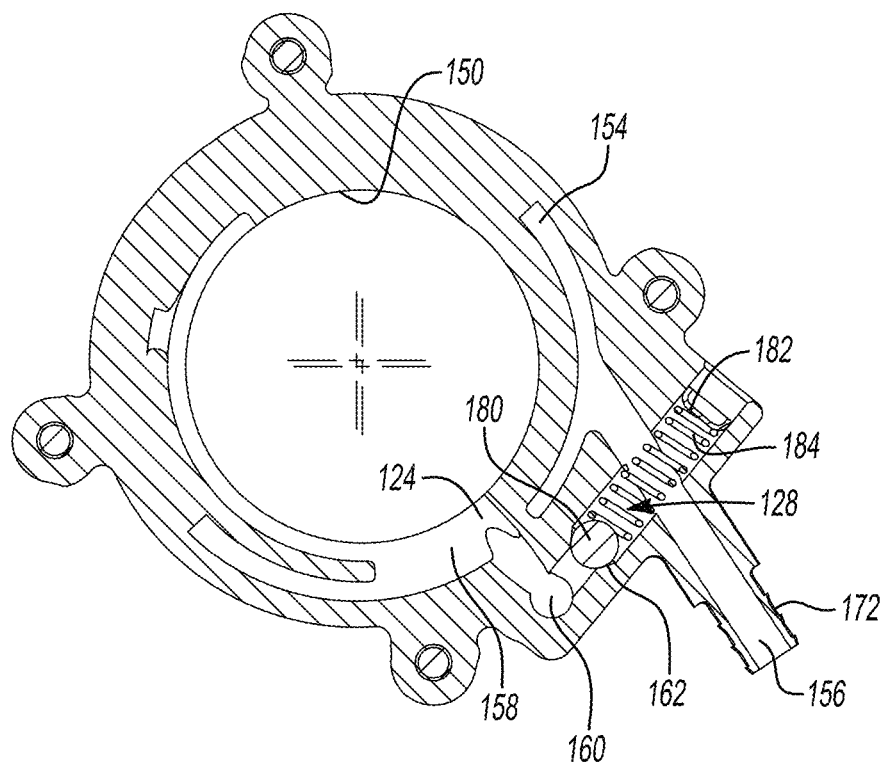
FIG. 7 is a section view taken through the housing member of the pump along a centerline of an inlet of the pump.
Figure 8:
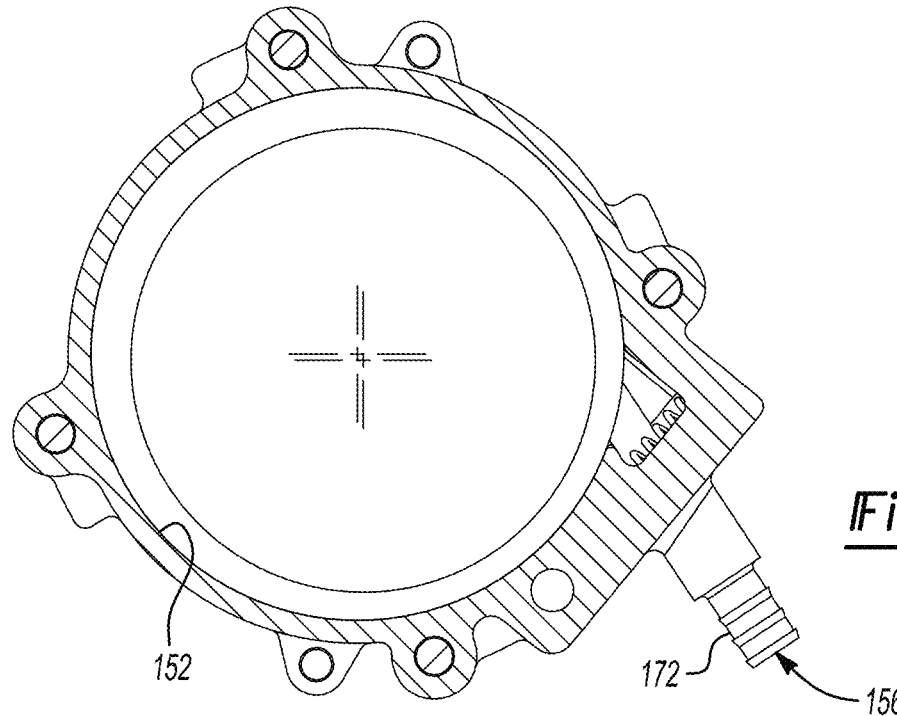
FIG. 8 is a section view taken through the housing member of the pump so as to intersect a rotor chamber formed in the housing member.
Figure 9:
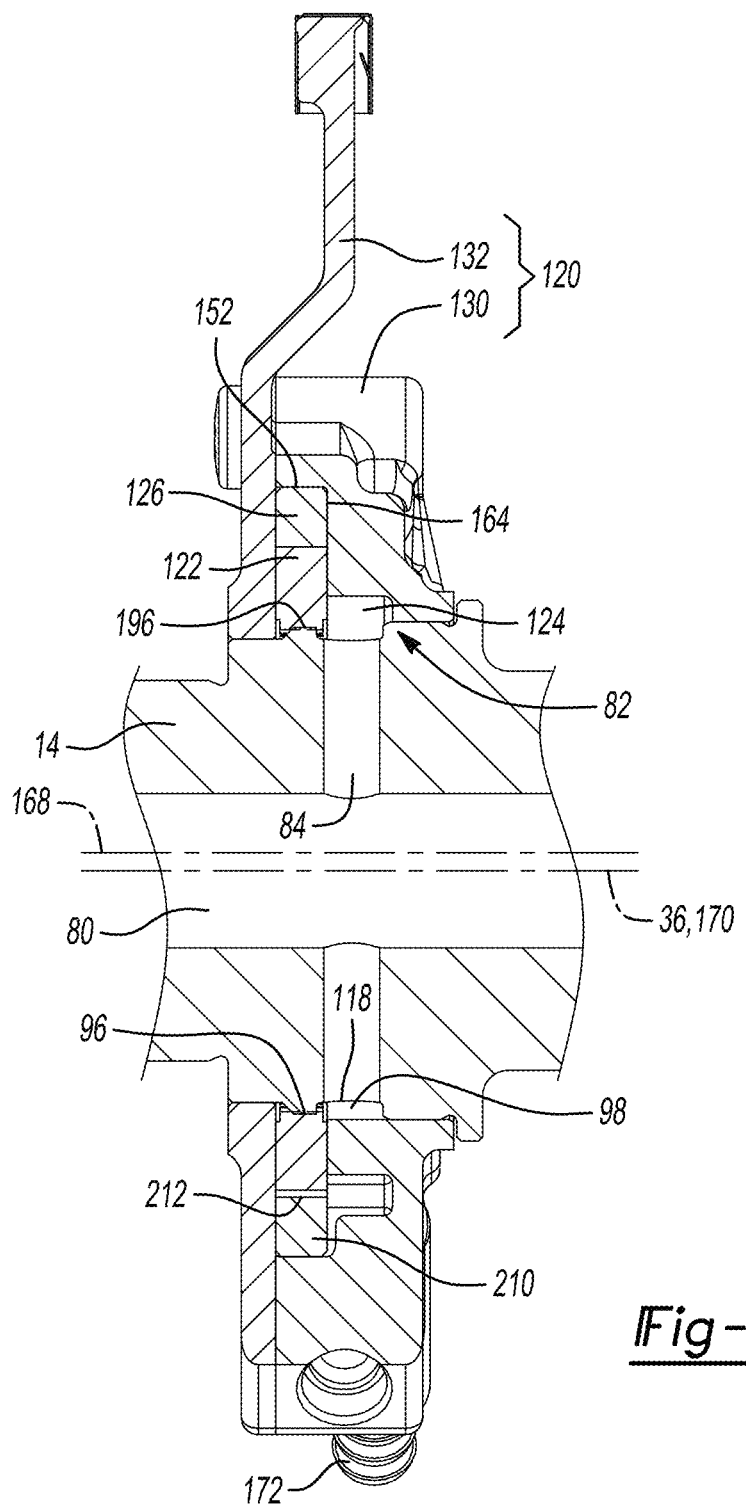
FIG. 9 is an enlarged portion of FIG. 1 illustrating the pump mount and the pump in more detail.

With reference to FIGS. 5 and 9, the rotor chamber 152 is formed in the pump housing 120 and can receive the first rotor 122 and the second rotor 126 therein. In the example provided, the rotor chamber 152 is disposed between an annular shoulder 164 in the housing member 130 and the cover 132, and the rotor chamber 152 extends along a rotor axis 168 that is offset from the axis 170 of the shaft bore 150 by a predetermined amount.

Returning to FIGS. 6 and 7, the inlet groove 154 is formed in the annular shoulder 164 in the housing member 130 and extends in a circumferential direction about a portion of the rotor chamber 152 radially inwardly from the outer diametrical surface of the rotor chamber 152. The inlet 156 can be formed through an exterior surface of the housing member 130 and can intersect the inlet groove 154. In the example shown, a barbed fitting 172 is fixedly coupled to the inlet 156 and is configured to be coupled to a tube (not shown) that extends into a sump S (FIG. 1) of the power transmitting component 10 (FIG. 1). The outlet groove 158 can also be formed in the annular shoulder 164 in the housing member 130 about a portion of the rotor chamber 152 radially inwardly from the outer diametrical surface of the rotor chamber 152. The pump outlet 124 can be defined by the housing member 130 and can extend radially inwardly from an end of the outlet groove 158 that is disposed closest to the inlet groove 154. The pump outlet 124 can intersect the shaft bore 150. The relief conduit 160 can extend between the end of the outlet groove 158 that is disposed closest to the inlet groove 154 and the inlet 156. The valve seat 162 can be disposed concentrically about a portion of the inlet groove 154 and is configured to sealingly engage a check ball 180 that is received into the relief conduit 160 at a location prior to the intersection of the relief conduit 160 with the inlet 156. A plug 182 can be received into the relief conduit 160 and can seal the housing member 130 in the area where the relief conduit 160 passes through an exterior surface of the housing member 130. A spring 184 can be received between the check ball 180 and the plug 182 and can bias the check ball 180 into sealing engagement with the valve seat 162. It will be appreciated that the valve seat 162, the check ball 180, the plug 182 and the spring 184 form the relief valve 128.

Figure 10:
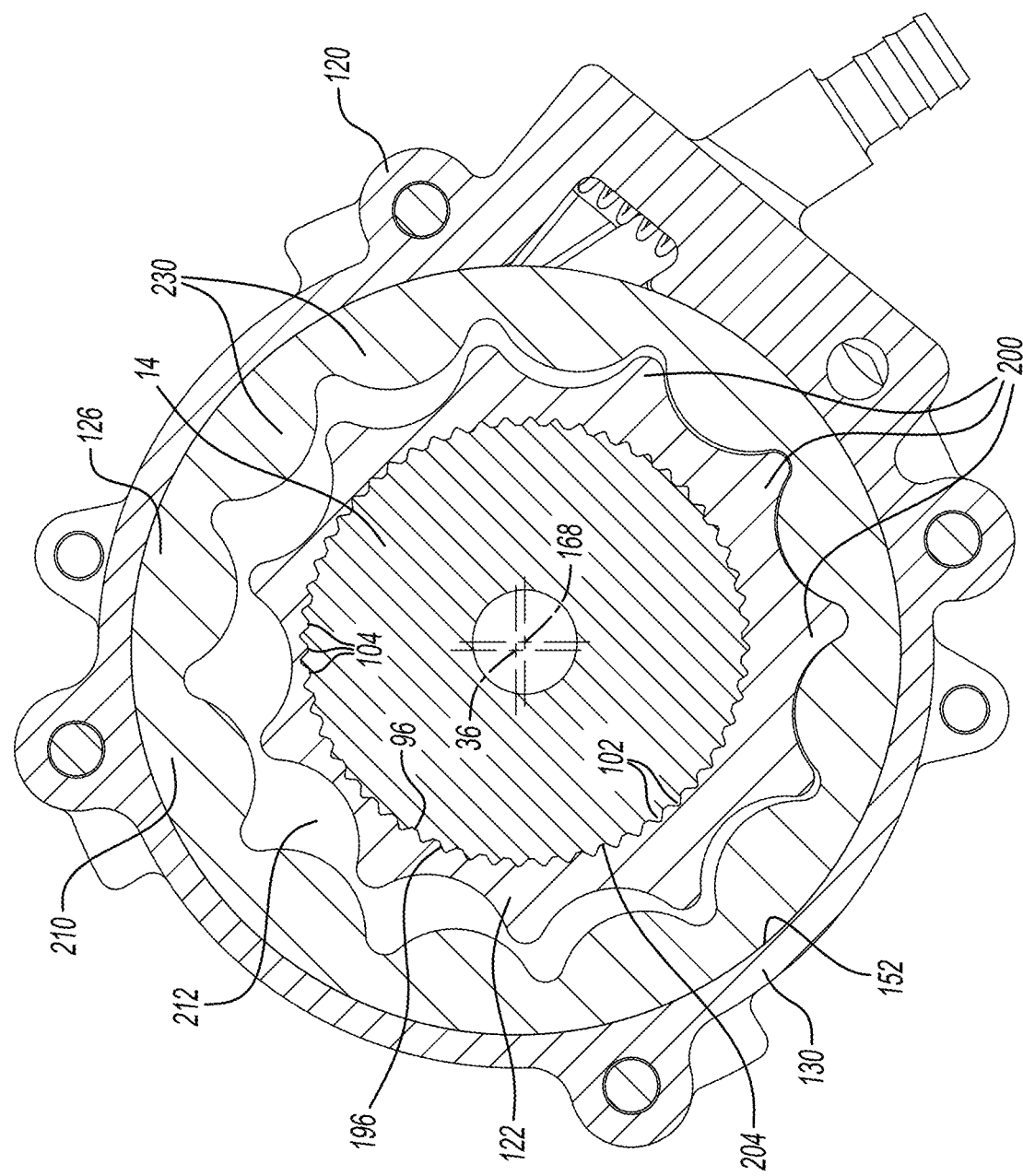
FIG. 10 is a section view taken through the pump mount and the pump.

With reference to FIGS. 5, 9 and 10, the first rotor 122 can include a mating drive portion 196 and a plurality of pump elements 200 that are disposed circumferentially about the first rotor 122. The mating drive portion 196 is configured to drivingly engage with the drive portion 96 of the pump mount 82 on the first shaft 14 to permit the first rotor 122 to rotate about the first axis 36. In the example provided, the mating drive portion 96 defines an internally toothed aperture 204 that engages with the teeth 102 of the drive portion 96. Optionally, the internally toothed aperture 204 can engage with the teeth 102 and the valleys 104 of the drive portion 96 in a manner (e.g., press fit) that inhibits or limits fluid transmission between the first rotor 122 and the drive portion 96 of the first shaft 14. The pump elements 200 in the example provided are first gerotor teeth. It will be appreciated that other pump configurations would be configured different. For example, the pump elements a vane pump would be vanes, while the pump elements of a gear pump would be gear teeth.

The second rotor 126 can have a rotor body 210 having a rotor aperture 212 formed therethrough. The rotor body 210 is sized to be received into the rotor chamber 152 in the housing member 130 so that the second rotor 126 is rotatable about the rotor axis 168 within the rotor chamber 152 relative to the pump housing 120. The rotor aperture 122 can have a plurality of second gerotor teeth 230 that can mesh with the first gerotor teeth 200 on the first rotor 122.

With reference to FIGS. 1, 5, 9 and 10, rotary power input through the input member 20 during operation of the power transmitting component 10 is transmitted through the transmission 22 to the first shaft 14 to cause rotation of the first shaft 14 about the first axis 36 in a predetermined rotational direction. Rotation of the first shaft 14 causes corresponding rotation of the first rotor 122 about the first axis 36 within the pump housing 120. Rotation of the first rotor 122 causes corresponding rotation of the second rotor 126 about the rotor axis 168 within the pump housing 120. Radial space between the first and second rotors 122 and 126 is disposed in fluid communication with the inlet groove 154. Due to the relative size difference between the first rotor 122 and the rotor aperture 212, as well as the offset between the first axis 36 and the rotor axis 168, the radial space between the first and second rotors 122 and 126 initially widens as the first rotor 122 rotates in the predetermined rotational direction, which draws fluid from the sump S, through the inlet 156, into the inlet groove 154 and between the first and second gerotor teeth 200 and 230. The radial space between the first and second rotors 122 and 126 subsequently narrows as the first rotor 122 rotates in the predetermined rotational direction (counterclockwise in FIG. 10), which increases the pressure of the fluid that is trapped between the first and second gerotor teeth 200 and 230. Pressurized fluid is discharged from between the first and second gerotor teeth 200 and 230 when the trapped fluid between the first and second gerotor teeth 200 and 230 is able to flow into the outlet groove 158 or the pump outlet 124. If pressure in the outlet groove 158 and pump outlet 124 becomes too high, the pressure of the fluid in the relief conduit 160 can urge the check ball 180 (FIG. 7) away from the valve seat 162 (FIG. 7) so that pressurized fluid can be discharged to the inlet 156.

Pressurized fluid in the pump outlet 124 can be discharged into the channel 98 in the pump mount 82 on the first shaft 14. The pressurized fluid in the channel 98 can migrate about the circumference of the first shaft 14 (i.e., can fill the channel 98) and can flow through the feed conduit 84 into the longitudinal bore 80. Due to placement of the feed conduit 84 in the circumferential surface 118 of the channel 98, no portion of the feed conduit 84 is blocked at any rotational position of the first shaft 14 relative to the pump outlet 124 and consequently, full flow of fluid from the pump outlet 124 into the feed conduit 84 is experienced regardless of the rotational position of the feed conduit 84 relative to the pump outlet 124. Consequently, means for alleviating blockage of the feed conduit 84, such as the use of a heavy (i.e., large diameter) chamfer on the edge of the feed conduit 84 that intersects the circumferential surface 118 of the channel 98, need not be employed.

Pressurized fluid in the longitudinal bore 80 can be employed to lubricate and/or operate desired components. For example, one or more of the lubricant feed apertures 86 can be formed through the first shaft 14 and can intersect the longitudinal bore 80 to lubricate the transmission 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting component comprising:
    a first shaft having a longitudinal bore, a pump mount and a feed conduit, the pump mount having a first circumferentially extending surface, a second circumferentially extending surface, a shoulder, an undercut groove, a drive portion and a channel that extends circumferentially about the first shaft, the shoulder extending circumferentially about the first shaft, the undercut groove being disposed between the shoulder and the first circumferentially extending surface, the channel being disposed along a longitudinal axis of the first shaft between the drive portion and the first circumferentially extending surface, the drive portion being disposed between the channel and the second circumferentially extending surface, the feed conduit intersecting and fluidly coupling the longitudinal bore and the channel; and
    a pump having a pump housing, and a first rotor, the pump housing having a housing member and a cover, the housing member defining a pump outlet, the housing member being mounted about the first circumferentially extending surface and being disposed circumferentially about the channel, the first rotor being coupled to the drive portion for rotation therewith, the pump outlet being coupled in fluid communication with the channel such that fluid discharged from the pump outlet during operation of the pump flows through the feed conduit from the channel to the longitudinal bore, the cover being fixedly coupled to the housing member and having an inside circumferential surface that is disposed circumferentially about the second circumferentially extending surface;
    wherein the housing member defines an annular shoulder, wherein a first axial end of the first rotor abuts the annular shoulder and a second axial end of the rotor abuts the cover, wherein a plane defined by the first axial end of the first rotor is disposed along the longitudinal axis at a location where the plane intersects the feed conduit, and wherein the inside circumferential surface of the cover is disposed radially inwardly of the first rotor.

2. The power transmitting component of claim 1, wherein the drive portion comprises a plurality of spline teeth.

3. The power transmitting component of claim 2, wherein the feed conduit is spaced apart from the spline teeth by a distance that is less than or equal to 2 mm.

4. The power transmitting component of claim 3, wherein the distance is less than or equal to 1 mm.

5. The power transmitting component of claim 4, wherein the distance is less than or equal to 0.5 mm.

6. The power transmitting component of claim 2, wherein the spline teeth are cold formed.

7. The power transmitting component of claim 1, further comprising:
    a power transmitting component housing supporting the first shaft for rotation about a first axis;
    a second shaft supported by the power transmitting component housing for rotation about a second axis; and
    a power transfer mechanism that is configured to transmit rotary power between the first and second shafts, the power transfer mechanism including a first sprocket, a second sprocket and a chain that is drivingly engaged to the first and second sprockets.

8. The power transmitting component of claim 7, wherein a clutch is disposed between the first shaft and the first sprocket.

9. The power transmitting component of claim 7, further comprising:
    an input member that is rotatable about the first axis; and
    a transmission disposed between the first shaft and the input member;
    wherein at least one lubricant feed aperture is formed in the first shaft and intersects the longitudinal bore in the first shaft.

10. The power transmitting component of claim 1, further comprising a second rotor rotatably received in the pump housing, the second rotor being disposed radially outwardly of the first rotor.

11. The power transmitting component of claim 1, wherein the cover is not sealed to the first shaft.

12. The power transmitting component of claim 1, wherein no part of the pump physically contacts the first circumferentially extending surface.

* * * * *